US006178078B1

(12) United States Patent
Yamanishi

(10) Patent No.: US 6,178,078 B1
(45) **Date of Patent: *Jan. 23, 2001**

(54) DISCHARGE GAP DEVICE AND ITS MOUNTING STRUCTURE

(75) Inventor: Yoshihiro Yamanishi, Osaka (JP)

(73) Assignee: Funai Electric Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/190,758

(22) Filed: Nov. 12, 1998

(30) Foreign Application Priority Data

Nov. 12, 1997 (JP) ..................................................... 9-310178
Dec. 26, 1997 (JP) ..................................................... 9-359115

(51) Int. Cl.[7] ....................................................... H02H 1/00
(52) U.S. Cl. ............................ 361/117; 361/138; 337/18; 337/28
(58) Field of Search .................................... 361/91.2, 110, 361/111, 117, 118, 119, 136, 748; 337/15–20, 28

(56) References Cited

U.S. PATENT DOCUMENTS 3,676,742 * 7/1972 Russell et al. ......................... 361/56
4,443,830 * 4/1984 Kaneko et al. ................... 361/275.3
4,472,754 * 9/1984 Mizukoshi et al. .................. 361/127
4,626,957 * 12/1986 Kaneko et al. ................... 361/275.1
4,783,555 * 11/1988 Blanchard et al. .................. 364/569
4,944,004 * 7/1990 Morley et al. ........................ 379/412
5,421,312 * 6/1995 Dawson ............................... 123/620
5,461,533 * 10/1995 Yoshida et al. ....................... 361/112

* cited by examiner

*Primary Examiner*—Josie Ballato
*Assistant Examiner*—Kim Huynh
(74) *Attorney, Agent, or Firm*—Lackenbach Siegel Marzullo Aronson & Greenspan

(57) ABSTRACT

A discharge gap device which is provided between an antenna input terminal or a secondary side earth and a commercial power source, or between the power lines of a commercial power source as a ground discharge countermeasure for electrical equipments such as a television set, a video cassette recorder, and a television and video compound device. The discharge gap device functions only as a discharge gap unit and has two conductors. Normally, the conductors are not electrically connected to each other, and upon application of over-voltage, discharge occurs between the conductors; that is, the conductors are electrically connected to each other.

11 Claims, 6 Drawing Sheets

DISCHARGE GAP DEVICE AND ITS MOUNTING STRUCTURE

BACKGROUND OF THE INVENTION

1. Field of the Invention

This invention relates to a discharge gap device in which discharge occurs between conductors, and more specifically to a discharge gap device which is provided between an antenna input terminal or a secondary side earth and a commercial power source, or between the power lines of a commercial power source as a ground discharge counter-measure for electrical equipments such as a television set, a video cassette recorder, and a television and video compound device, and to its mounting structure.

2. Description of the Related Art

A CR (capacitor and resistor) compound part 21 whose circuit arrangement is as shown in FIG. 7 is known as a discharge gap device (for instance, B2R131C131, R1-2M121MF, etc. manufactured by Murata Manufacturing Co., Ltd.).

The CR compound part 21 comprises a discharge gap unit 22, a resistor 23, and a capacitor 24 which are connected in parallel to one another.

FIGS. 8(*a*) and 8(*b*) are external views of the CR compound part 21 shown in FIG. 7.

As shown in FIGS. 8(*a*) and 8(*b*), in the CR compound part 21, lead wires 27 and 28, which are to be inserted into a printed circuit board (not shown) , are welded on a surface 29*a* of a dielectric 29 with soldering patterns 25 and 26 which are conductors, and a resistor 23 is connected between the soldering patterns 25 and 26. On a rear surface 29*b* of the dielectric 29, a silver (conductor) pattern 30 is printed or bonded, and the entire rear surface is covered with resin (not shown) so as to cover the silver pattern 30.

With the discharge gap device thus designed, ends 25*a* and 26*a* of the soldering patterns 25 and 26 form the discharge gap unit 22, while the dielectric 29 is held between the soldering patterns 25 and 26 and the silver pattern 30 to form the capacitor 24. Thus, as shown in FIG. 7, a discharge circuit has been formed in which the discharge gap unit 22, the resistor 23, and the capacitor 24 are connected in parallel to one another.

FIG. 9 is a circuit diagram showing the discharge gap device (CR compound part 21) applied to a television set.

As shown in FIG. 9, the current of a commercial power source 16 is applied to a rectifier circuit 17, and the current rectified by the circuit 17 is supplied to a power source circuit (or switching power source circuit) 18. The output current of the circuit 18 is supplied to a variety of load circuits.

A tuner 19 of the television set is connected through the discharge gap device 21 to the aforementioned commercial power source 16. Normally, the discharge gap unit 22 is in non-conduction state; that is, the tuner 19 is insulated from the commercial power source 16. A filter 20 is provided between the CR compound part 21 and the tuner 19. The filter 20 is made up of a coil and the like to cut off high frequency components.

In FIG. 9, the one-dot chain line A indicates a primary power source side between the commercial power source 16 and the switch power source circuit 18, and the other one-dot chain line B indicates a secondary power source side at the rear stage of the switching power source circuit 18.

An earth (ground) E1 forming the rectifier circuit 17, and an earth E2 which is connected through a capacitor C between the rectifier circuit 17 and the switching power source circuit 18 mean the earth of the primary power source side A, and are at the same potential. Furthermore, an earth E3 forming the switching power source circuit 18, and earths E4 and E5 of the tuner 19 mean the earth of the secondary power source side B. and are at the same potential.

With the above-described circuit, when ground discharge occurs, the load circuits are prevented from damage as follows:

For instance, when the occurrence of ground discharge causes and high voltage is applied through the antenna (not shown) to the antenna input terminal 19*a* of the tuner 19, the gap of the discharge gap unit 22 of the CR compound part 1 connected to the tuner 19 is made conductive by the discharge, so that the high voltage is applied to the commercial power source 16. The high voltage does not go to the side of the secondary power source B, whereby the load circuits are prevented from damage.

FIG. 10 is a circuit diagram showing the case where the two above-described conventional CR compound parts 21 are used.

In this discharge gap device, the two CR compound parts 21 and 21 are connected in series to each other, and one of the CR compound parts 21 is shunted by a capacitor C.

The two compound parts 21 and 21 are used mainly, for instance for a television set combined with a video cassette recorder, to meet the safety standard.

For instance, the UL (Underwriters laboratories) standard in U.S.A. is as follows: In the safety standard for a popular television set, it is necessary that the gap of the discharge gap unit 22 is at least 1.6 mm; and in the safety standard for a television set combined with a video cassette recorder, it is at least 3.2 mm because double insulation is required.

In the discharge gap device of the CR compound part 21, the gap G (between the ends 25*a* and 26*a* of the soldering patterns 25 and 26) of the discharge gap unit 22 is set to 2.6 mm. Therefore, in order to provide 3.2 mm, it is necessary to additionally manufacture a CR compound part. Hence, in order to meet the UL standard, two 1.6 mm-gap CR compound parts 21 are used to make the gap 3.2 mm.

Incidentally, in the above-described related art, the CR compound part 21 is employed as the discharge gap device. Hence, in the case where it is required to use a variety of resistances, it is necessary to newly manufacture CR compound parts.

Furthermore, the CR compound part 21 includes the capacitor 24, and in the case of the ordinary connection, high frequency components pass through the CR compound part through the capacitor 24, as a result of which high frequency components from the commercial power source is applied to the secondary circuit of the tuner 19, or high frequency components from the secondary circuit of the tuner 19 are superposed on the power.

Hence, sometimes, it is necessary to connect the CR compound part 21 and a filter 20 to cut off the high frequency components.

Furthermore, in order to meet the safety standard of a television set combined with a video cassette recorder, the two CR compound parts 21 are employed; that is, the number of components is increased as much.

SUMMARY OF THE INVENTION

In view of the foregoing, an object of the invention is to provide a discharge gap device and its mounting structure in which the resistance can be changed with ease, and the passage of high frequency components is less, and in which discharge occurs positively in the gap of the discharge gap unit which provides no problem in safety.

In order to achieve the above object, the invention provides a discharge gap device comprising conductors which are arranged spaced from each other so that a space between the conductors is used as a discharge gap, and which functions only as a discharge gap unit, wherein the conductors are normally held non-conductive to each other, and when over-voltage is applied between the conductors, discharge occurs between the conductors so that the conductor are electrically conductive to each other.

Further, the invention provides a mounting structure of the discharge gap device, wherein a resistor is formed on a printed circuit board which is in parallel to the discharge gap device.

The invention provides a discharge gap device which functions only as a discharge gap unit, comprising: a dielectric; at least two lead wires which are inserted into a printed circuit board; and at least two conductors which are connected to the lead wires and provided on the dielectric, wherein upon application of over-voltage, discharge is caused to occur between the conductors, so that the lead wires are made electrically connected to one another.

Further, the invention provides a mounting structure of the discharge gap device, wherein a resistor in parallel with the discharge gap device is provided on the printed circuit board.

DETAILED DESCRIPTION OF THE PREFERRED EMBODIMENTS

Preferred embodiments of the invention will be described with reference to the accompanying drawings.

Figure 1:
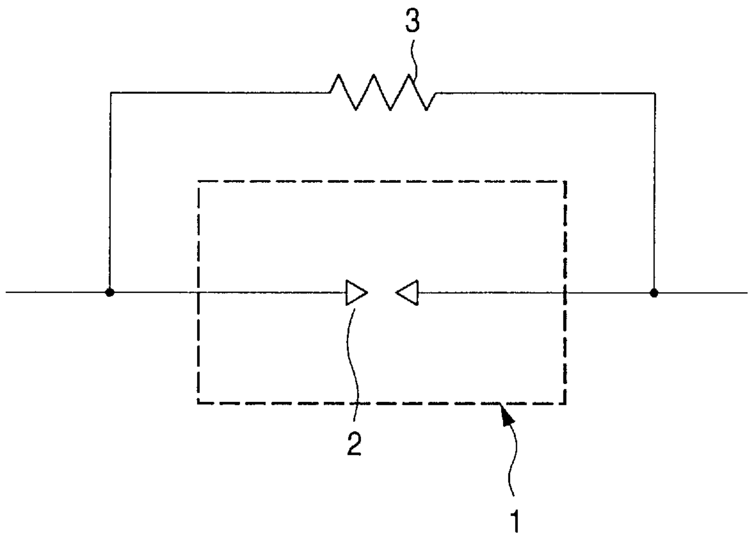
FIG. 1 is an electrical circuit diagram showing an example of a discharge gap device, which constitutes a first embodiment of the invention.
Figure 2:
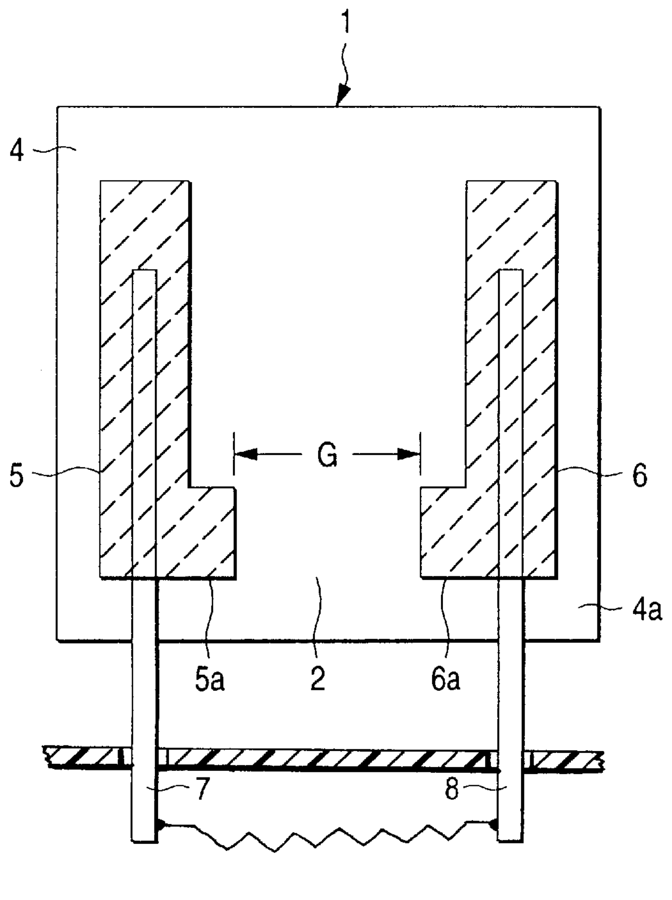
FIG. 2 is an external view showing the discharge gap device.

FIG. 1 is an electrical circuit diagram showing a discharge gap device according to the invention. FIG. 2 is a view showing an external appearance of the discharge gap device of the invention.

The discharge gap device and its mounting structure are employed for AV equipments such as a television set and a television set combined with a video cassette recorder, to protect the equipments from high voltage attributing to ground discharge.

The discharge gap device 1 comprises only a discharge gap unit 2, and a resistor 3 which is a separate component is formed on a printed circuit board (not shown) . The discharge gap device 1 is substantially rectangular as shown in FIG. 2, and it is made up of a pair of soldering patterns (conductors) 5 and 6 on a surface 4*a* of a dielectric 4 of dielectric material such as ceramic base. Further, leadwires 7 and 8 to be inserted into the printed circuit board are connected to the soldering patterns 5 and 6.

The soldering patterns 5 and 6 are elongated and symmetrical with each other, and their base ends are extended towards each other forming protruded ends 5*a* and 6*a*. The gap G between those protruded ends 5*a* and 6*a* provides a discharge gap unit 2 according to the safety standard.

In this embodiment, in order to meet the UL standard of U.S.A., the gap G for a television set is set to 1.6 mm, and the gap G for a television set combined with a video cassette recorder which needs double insulation is set to 3.2 mm. In this case, the circuit is different from the conventional CR compound part in which the discharge gap unit, the resistor, and the capacitor are connected in parallel to one another. Therefore, as for a television set combined with a video cassette recorder, the discharge gap unit 2 should be such that the gap G between the protruded ends 5*a* and 6*a* is 3.2 mm.

On the other hand, in the UL standard, the discharge voltage between conductors is set to 1.3 KV for safety. Therefore, it is preferable that the discharge gap device be manufactured so that no discharge occurs between the conductors at 2 to 3 KV, also in the case where the discharge gap device is employed for another electrical equipment including a television set.

On the rear surface (not shown) of the dielectric 4, no silver patterns (conductors in the related art) are printed or bonded.

The soldering patterns 5 and 6 may be any conductor which is printed or bonded on the dielectric. The employment of the soldering patterns 5 and 6 eliminates the step of connecting the lead wires 7 and 8 to the dielectric 4, and the step of mounting the conductors on the dielectric 4. Hence, it is preferable that the conductors are the soldering patterns 5 and 6.

Patterns or the like are not formed on the rear surface of the dielectric 4, and therefore the dielectric 4 does not work as a capacitor; however, since the dielectric is of ceramic base or the like, discharge is liable to occur between the protruded ends 5*a* and 6*a*.

in the discharge gap device 1 having no capacitor, the discharge gap unit 2 is formed on the dielectric 4. Therefore, the discharge in the gap occurs on the dielectric 4; that is, the discharge is liable to occur when compared with the discharge occurring in the air or between the insulators. Hence, the distance between the primary power source side and the secondary power source side may be long, and the short-circuiting of the primary and second power source sides is prevented. That is, the discharge gap device serves stably as an over-voltage protective circuit in the case of ground discharge or the like.

Figure 3:
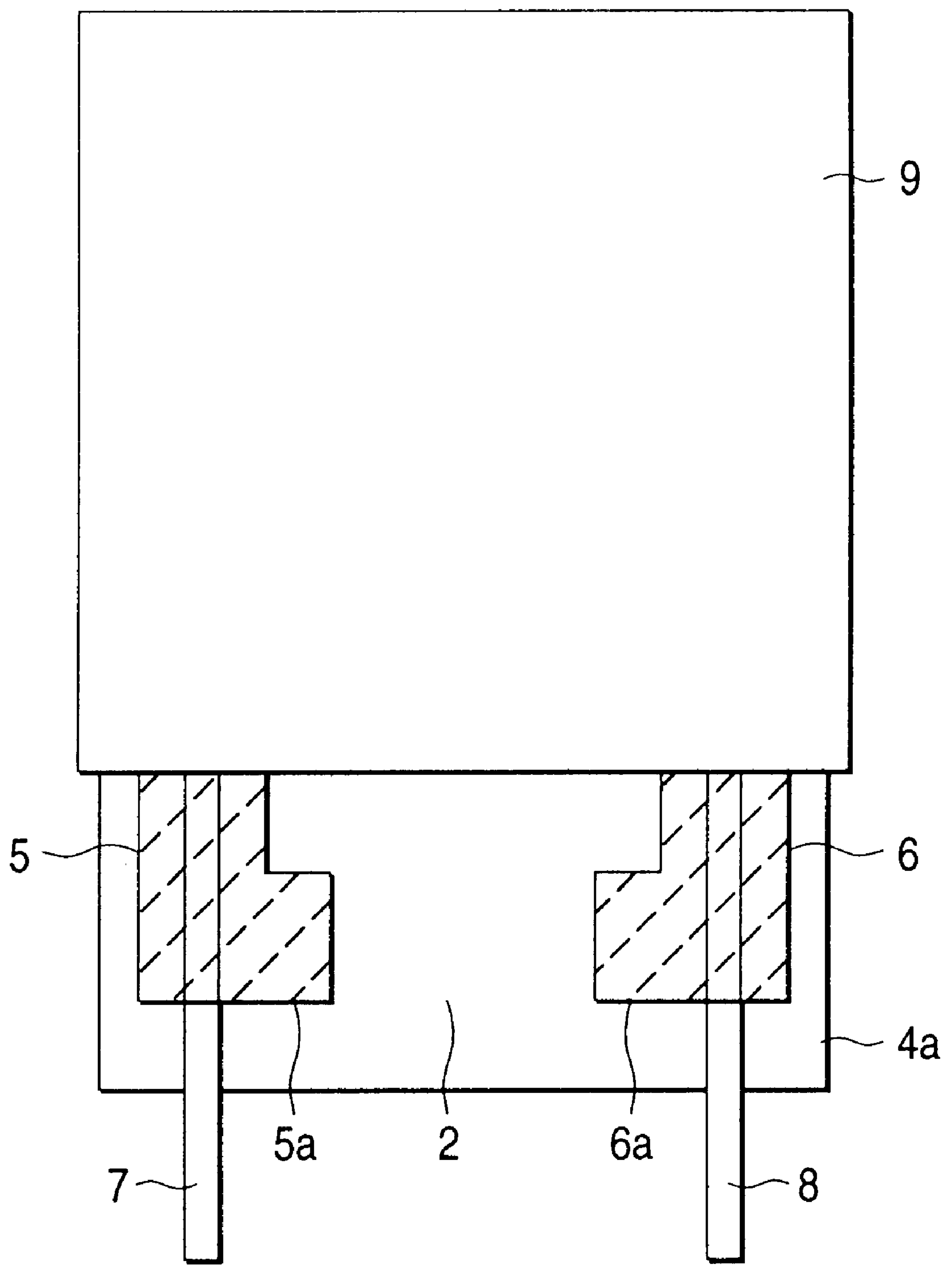
FIG. 3 is an external view showing the discharge gap device which is covered with resin.

If necessary, a resin layer 9 may be formed in such a manner that it covers the substantially whole surface of the dielectric 4 as shown in FIG. 3. The covering of the dielectric 4 is to prevent the soldering patterns 5 and 6 from peeling off. It is preferable that the protruded ends 5*a* and 6*a* of the soldering patterns 5 and 6 are not covered with the resin layer 9 as shown in FIG. 3, because the covering of the protruded ends 5*a* and 6*a* obstructs the discharge.

Now, an example of the formation of the discharge gap device with electrodes will be described.

Figure 4:
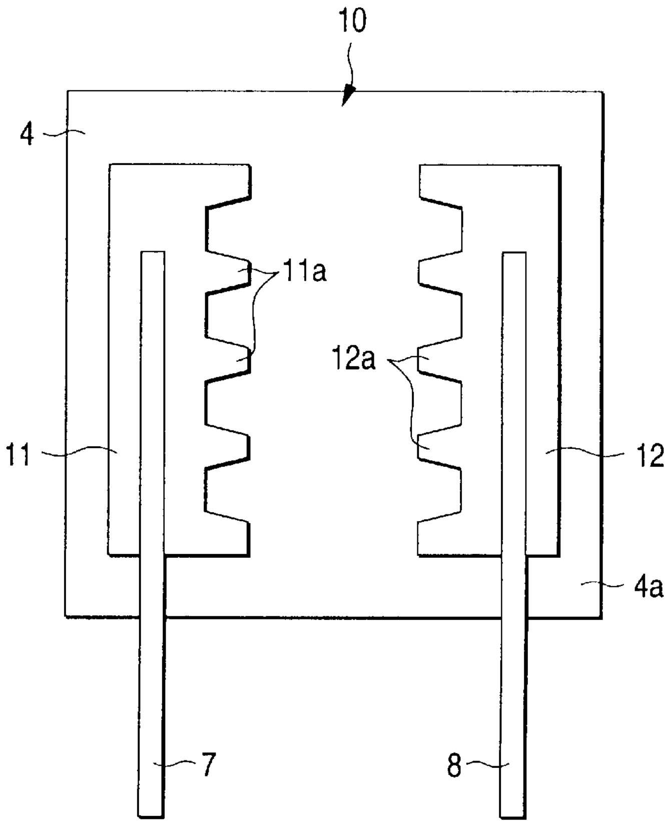
FIG. 4 is an external view showing another example of the discharge gap device, which constitutes a second embodiment of the invention.

A discharge gap device 10 shown in FIG. 4 is formed as follows: Conductor, namely, silver paste is printed on the surface 4*a* of the dielectric 4 by print-etching, and then hardened by baking.

In the discharge gap device 10, the sides of the sliver paste portions which are confronted with each other are made zig-zag, thus providing five pairs of protrusions. Thus, protruded ends 11*a* and 12*a* are formed. The protruded ends 11*a* and 12*a* form the discharge gap unit 2. Hence, discharge occurs between a number of protruded ends 11*a* and a number of protruded ends 12*a*, whereby the discharge is stable. Therefore, the burning of the discharge portions is less than in the case of only one pair of protruded ends. Further, the discharge gap device 10 is longer in service life.

Figure 5:
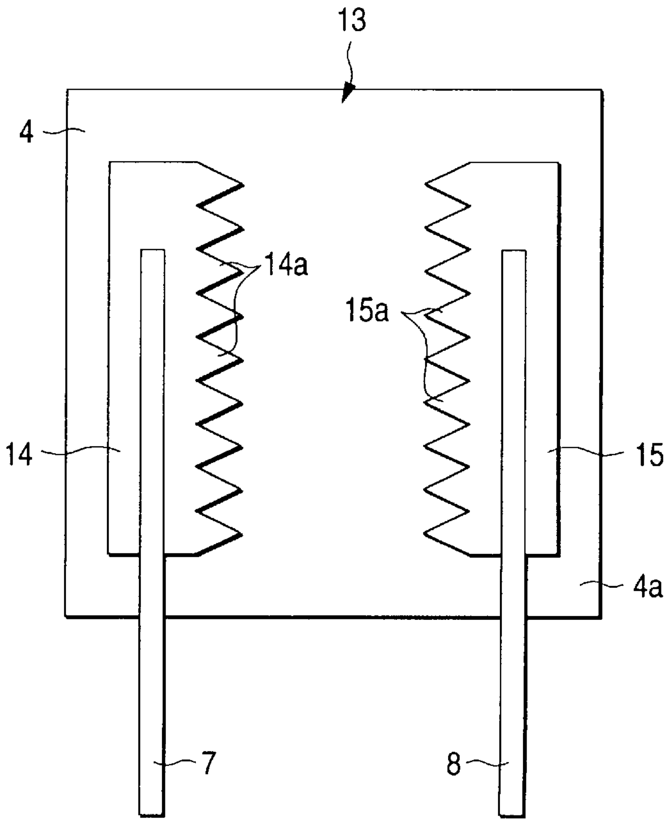
FIG. 5 is an external view showing a modification of the discharge gap device shown in FIG. 4.

In a discharge gap device 13 shown in FIG. 5, the sides of conductors which are confronted with each other are made saw-teeth shaped, so that a number of pairs of protruded ends 14*a* and 15*a* are formed. These protruded ends 14*a* and 15*a* provide a number of discharge gaps. Hence, similarly as in the above-described discharge gap device 10, the discharge is stable.

Figure 6:
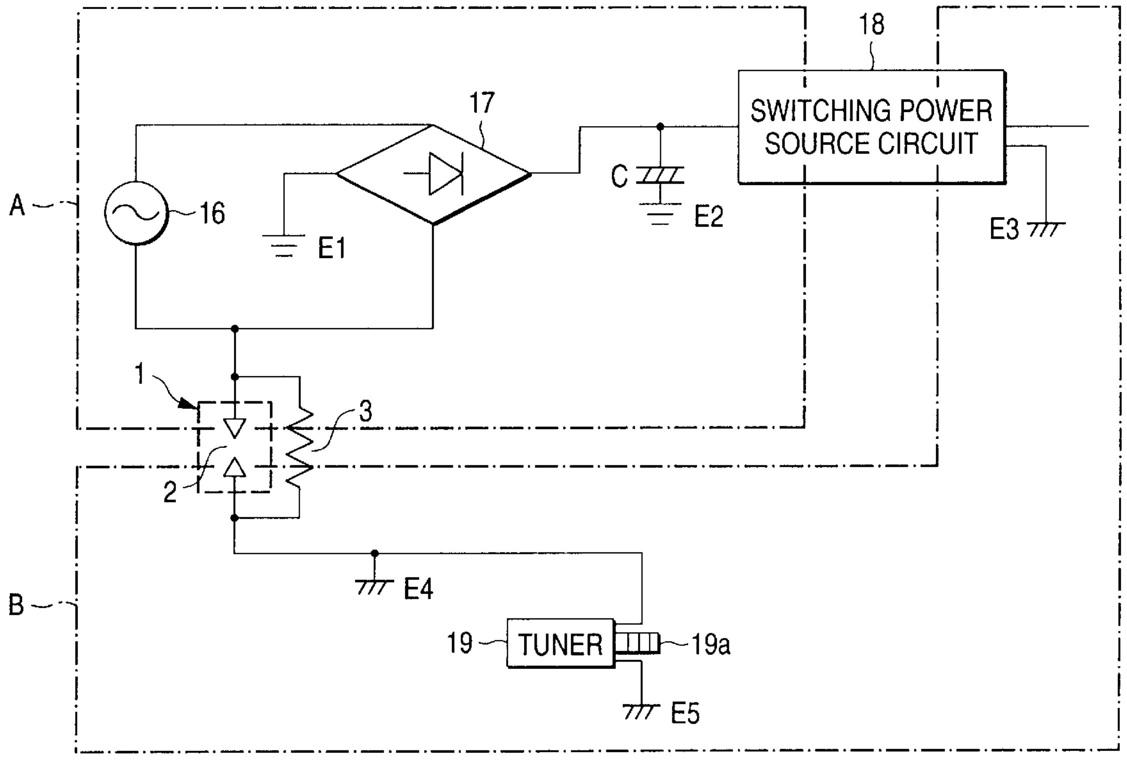
FIG. 6 is an electrical circuit diagram showing the discharge gap device applied to a television set.
Figure 7:
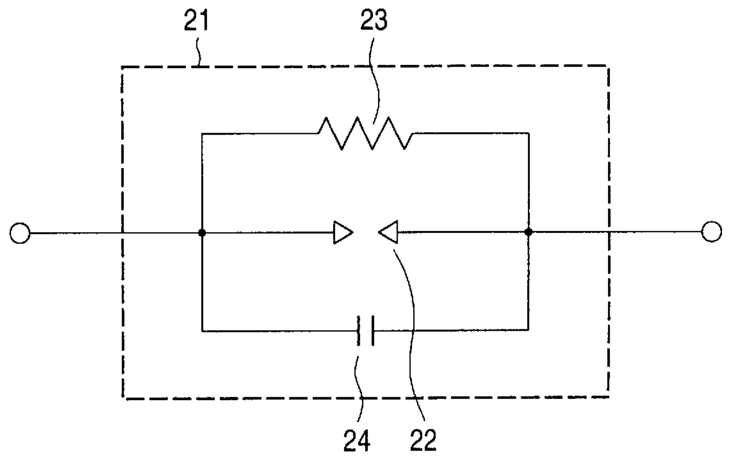
FIG. 7 PRIOR ART
FIG. 7 is an electrical circuit diagram showing an example of a conventional CR compound part.
Figure 8:
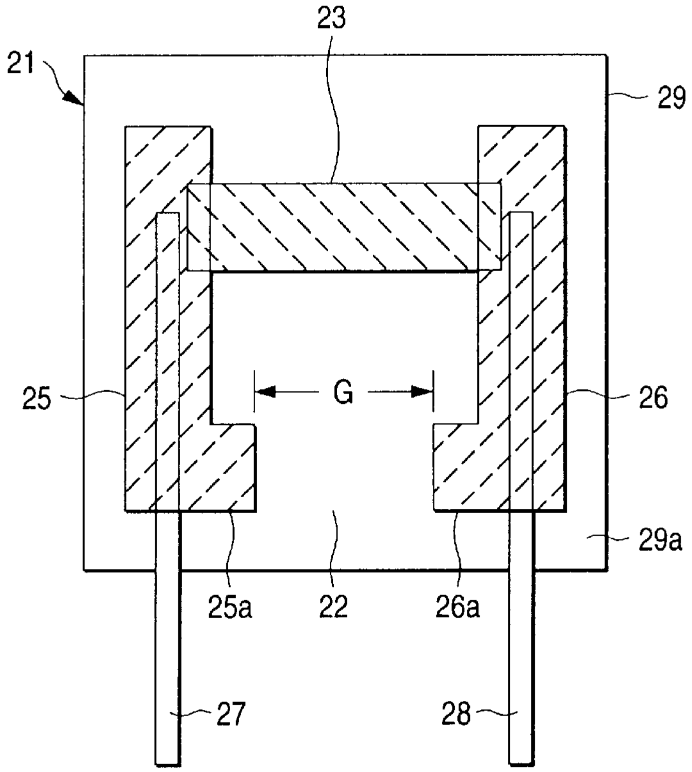
FIG. 8 (a) PRIOR ART
FIGS. 8(*a*) and 8(*b*) are external views showing the conventional CR compound part.
Figure 8:
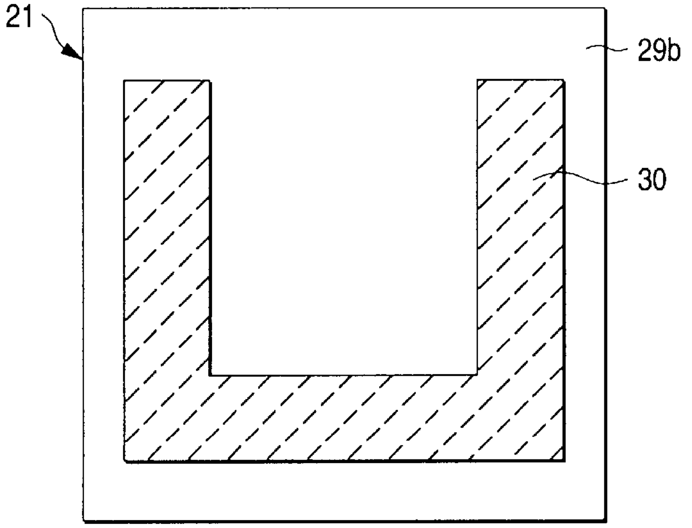
FIG. 8 (b) PRIOR ART

FIG. 6 is an electrical circuit diagram showing an example of the employment of the above-described discharge gap device 1 in a television set.

Figure 9:
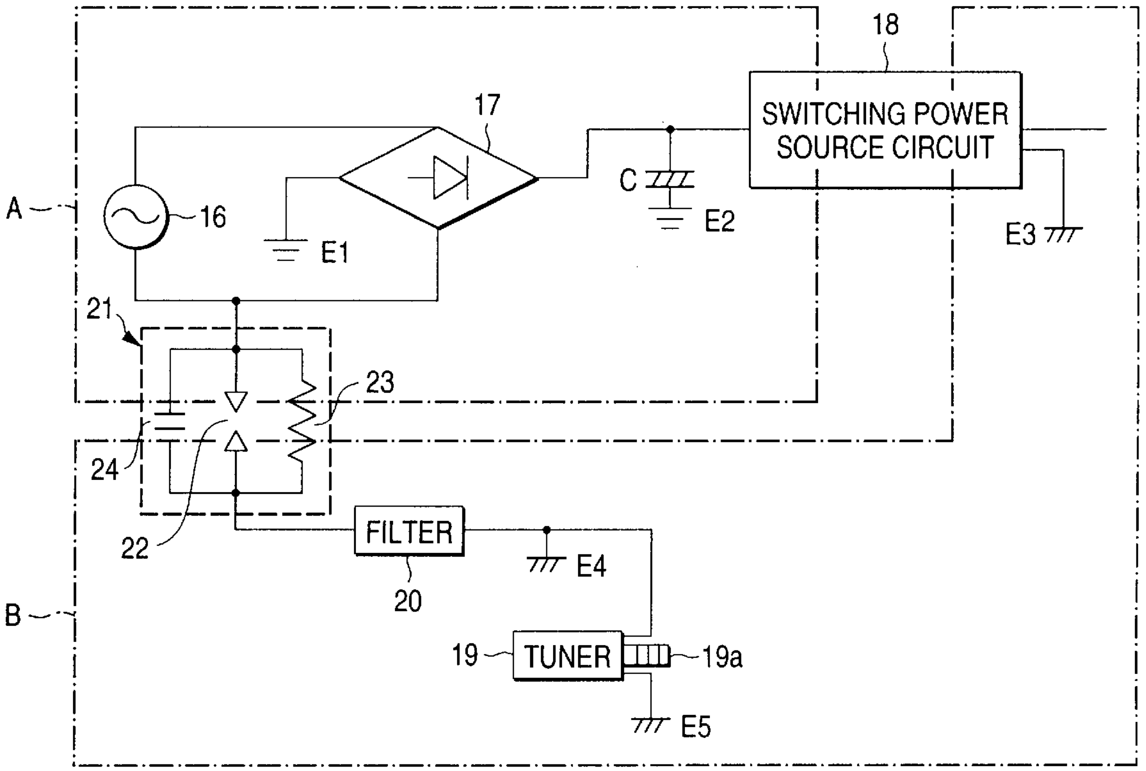
FIG. 9 PRIOR ART
FIG. 9 is an electrical circuit diagram showing the conventional CR compound part applied to a television set.
Figure 10:
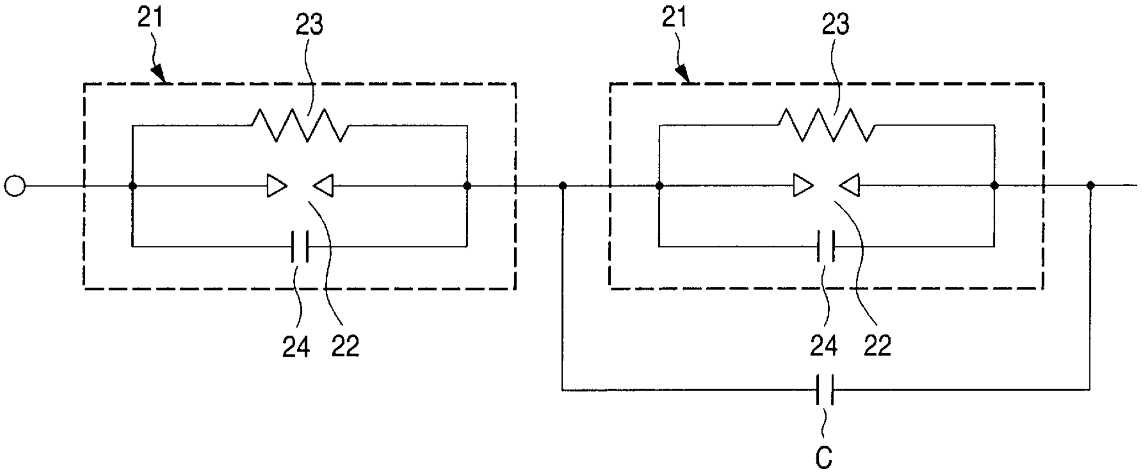
FIG. 10 PRIOR ART
FIG. 10 is an electrical circuit diagram showing another example of the conventional CR compound part.

In the television set, the discharge gap unit 2 is interposed between the side of the commercial power source 16 and the side of the tuner 19 of the television set. The circuit of FIG. 6 is equal in fundamental arrangement to the above-described conventional circuit of FIG. 9; therefore, in FIG. 6 parts corresponding functionally to those already described with reference to FIG. 9 are designated by the same reference numerals or characters.

As shown in FIG. 6, the discharge gap device 1 is connected between the commercial power source 16 of the television set and the tuner 19. Therefore, the discharge gap unit 2 of the discharge gap device 1 is normally held non-conductive; that is, the commercial power source 16 of the primary power source side A is insulated from the tuner 19 of the secondary power source side B.

Now, the prevention of a load circuit from damage at the time of ground discharge will be described.

In the case where, for instance because of the occurrence of ground discharge, high voltage is applied through the antenna (not shown) to the antenna input terminal 19*a* of the tuner 19, the discharge gap unit 2 of the discharge gap device 1 connected to the tuner 19 becomes conductive through discharge, the high voltage is run to the commercial power source 16. Hence, the high voltage is not run to the secondary power source side B of the product, which protects the load circuits from damage.

In the above-described embodiment, the discharge gap device 1 is interposed between the side of the commercial power source 16 of the television set and the side of the tuner 19; however, the invention is not limited thereto or thereby. That is, as a countermeasure against ground discharge, the discharge gap device may be interposed between the circuit (secondary circuit) connected to the secondary power source side and the commercial power source, or between the power lines of the commercial power source.

The discharge gap device designed as described above have the following effects or merits:

The conductors, which are arranged spaced from each other, are normally electrically not connected to each other; however, upon application of over-voltage, discharge is caused to occur between the conductors so that the conductors are electrically connected to each other. Therefore, parts other than the discharge gap unit can be arranged on the side of the printed circuit board as the case may be. Accordingly, when it is required to change parts other than the discharge gap unit, it is not necessary to newly manufacture a discharge gap device. Furthermore, it is not necessary to mount a capacitor or resistor which is not used. This means a reduction in the number of components of the discharge gap device.

Since the resistor, which is in parallel with the discharge gap device, is formed on the printed circuit board, a resistor different in resistance may be employed with ease as the case may be.

Further, in the discharge gap device of the invention, upon application of over-voltage, discharge occurs between at least two conductors on the dielectric, so that two or more lead wires are made electrically connected to one another. Since discharge occurring between the conductors is caused on the dielectric, it is possible to discharge with ease when compared with the discharge in the air or between insulators.

What is claimed is:

1. A discharge gap device adapted to be mounted on a printed circuit board (PCB), comprising:

a dielectric having two opposing surfaces;

at least two lead wires each having a portion adapted to be attached to the printed circuit board and another portion attached to one surface of said dielectric;

at least two conductors which are connected to said lead wires and provided on said one surface of said dielectric; and a resistor connected between said two lead wires in parallel with said discharge gap device without being directly attached to said at least two conductors or directly mounted on said dielectric, the other surface of said dielectric being free of conductive material to avoid shunting capacitance being formed across said at least two conductors and to prevent passage of high frequency components across the gap device, wherein upon application of over-voltage, discharge is caused to occur between said conductors.

2. The discharge gap device as claimed in claim 1, wherein said conductors are of solder.

3. The discharge gap device as claimed in claim 1, wherein said conductors are electrodes, and said electrodes are spaced a predetermined distance from each other so that said electrodes are confronted with each other.

4. The discharge gap device as claimed in claim 3, wherein said electrodes have protruded ends which are protruded towards each other.

5. The discharge gap device as claimed in claim 4, wherein each of said electrodes has a plurality of protruded ends.

6. The mounting structure of the discharge gap device as claimed in claim 1, wherein said discharge gap device is provided between a part which produces high voltage and a part which absorbs the high voltage.

7. The discharge gap device as claimed in claim 1, wherein said lead wires are connected to said dielectric by welding solder, and the resultant soldering regions are employed as said conductors.

8. The discharge gap device as claimed in claim 1, wherein at least a surface of said dielectric to which said lead wires are connected is covered with resin.

9. The discharge gap device as claimed in claim 1, wherein said conductors on said dielectric between which discharge occurs are not covered with resin.

10. The mounting structure of the discharge gap device as claimed in claim 1, wherein said discharge gap device is provided between a power source line to which a commercial power source is connected and a secondary circuit.

11. The mounting structure of the discharge gap device as claimed in claim 10, wherein the secondary circuit is an antenna input terminal of a tuner.

* * * * *